United States Patent
Yamamoto et al.

(10) Patent No.: US 8,611,715 B2
(45) Date of Patent: Dec. 17, 2013

(54) OPTICAL WAVEGUIDE AND METHOD OF MANUFACTURING THE SAME, AND OPTICAL WAVEGUIDE DEVICE

(75) Inventors: Takanori Yamamoto, Nagano (JP); Hideki Yonekura, Nagano (JP); Kenji Yanagisawa, Nagano (JP); Kazunao Yamamoto, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 134 days.

(21) Appl. No.: 13/302,116

(22) Filed: Nov. 22, 2011

(65) Prior Publication Data
US 2012/0134632 A1  May 31, 2012

(30) Foreign Application Priority Data
Nov. 26, 2010 (JP) .................................. 2010-263055

(51) Int. Cl.
*G02B 6/10* (2006.01)
*G02B 6/12* (2006.01)
*G02B 6/42* (2006.01)

(52) U.S. Cl.
USPC ................................ 385/129; 385/14; 385/47

(58) Field of Classification Search
None
See application file for complete search history.

(56) References Cited

U.S. PATENT DOCUMENTS

| | | | |
|---|---|---|---|
| 7,164,815 B2 * | 1/2007 | Yanagisawa et al. | 385/14 |
| 2008/0037929 A1 * | 2/2008 | Kim et al. | 385/14 |
| 2010/0074579 A1 | 3/2010 | Fujii | |

FOREIGN PATENT DOCUMENTS

JP  2010-78882 A1  4/2010

* cited by examiner

*Primary Examiner* — Omar Rojas
(74) *Attorney, Agent, or Firm* — Kratz, Quintos & Hanson, LLP

(57) ABSTRACT

A method of manufacturing an optical waveguide, includes forming a first cladding layer on a substrate, forming a core layer on the first cladding layer, forming a groove portion including a light path conversion inclined surface by processing the core layer in a thickness direction, and forming a second cladding layer in which a light path conversion hole is arranged on the light path conversion inclined surface on the first cladding layer and the core layer.

9 Claims, 8 Drawing Sheets

(plan view)

(plan view)

(plan view)

OPTICAL WAVEGUIDE AND METHOD OF MANUFACTURING THE SAME, AND OPTICAL WAVEGUIDE DEVICE

CROSS-REFERENCE TO RELATED APPLICATIONS

This application is based upon and claims the benefit of priority of the prior Japanese Patent Application No. 2010-263055, filed on Nov. 26, 2010, the entire contents of which are incorporated herein by reference.

FIELD

It is related to an optical waveguide and a method of manufacturing the same, and an optical waveguide device using the optical waveguide.

BACKGROUND

Recently, the development of the backbone network communication line as mainly focusing on the optical fiber communication technology is proceeding steadily and, in such a situation, the electronic wirings in the information terminal are becoming a bottleneck. Against such background, instead of the conventional electric circuit substrate in which all signal transmissions are made by using the electric signal, the optoelectronic composite substrate (the optical waveguide device) of the type that transmits high-speed parts by the light has been proposed, in order to compensate the limit of transmission speed of the electric signal.

In the optoelectronic composite substrate, the light signal is transmitted by the optical waveguide including such a structure in which the core layer is surrounded by the cladding layers.

In an example of the method of manufacturing the optical waveguide, first, the lower cladding layer, the core layer, and the upper cladding layer are formed sequentially on the substrate. Then, the core layer is processed by the rotary blade so as to divide the core layer from the upper cladding layer, so that the groove portions each having an inclined surface at an angle of 45° to the light propagation direction are formed.

Then, in the air boundary of the inclined surface in the groove portion, the light which is propagated through the core layer is made to reflect in the vertical direction, and the light path is converted.

A related art is disclosed in Japanese Laid-open Patent Publication No. 2010-78882.

In the prior art, the groove portions each having the inclined surface are formed as the release spaces that are extended elongately to intersect orthogonally with a plurality of core layers such that these release spaces go across the optical waveguide forming areas, after the core layers are covered with the upper cladding layer. Accordingly, since a volume of the groove portions becomes relatively large, the enough mechanical strength of the optical waveguide cannot be obtained. Also, since the groove portions are connected elongately, such a risk is increased that a foreign matter adheres to the inclined surfaces, thereby long-term reliability of the optical waveguide is feared.

Further, in the case that the groove portions are covered by fixing the coating member onto the optical waveguide by the adhesive, some devising is needed such that the adhesive does not go around the groove portions.

SUMMARY

According to one aspect discussed herein, there is provided a method of manufacturing an optical waveguide, which includes forming a first cladding layer on a substrate, forming a core layer on the first cladding layer, forming a groove portion including a light path conversion inclined surface by processing the core layer in a thickness direction, and forming a second cladding layer, in which a light path conversion hole is arranged on the light path conversion inclined surface, on the first cladding layer and the core layer.

According to another aspect discussed herein, there is provided an optical waveguide, which includes a first cladding layer, a core layer formed on the first cladding layer, a groove portion formed in a thickness direction of the core layer and including a light path conversion inclined surface, and a second cladding layer which is formed on the first cladding layer and the core layer and in which a light path conversion hole is arranged on the light path conversion inclined surface.

DESCRIPTION OF EMBODIMENTS

Embodiments of the present invention will be explained with reference to the accompanying drawings hereinafter.

First Embodiment

Figure 5:
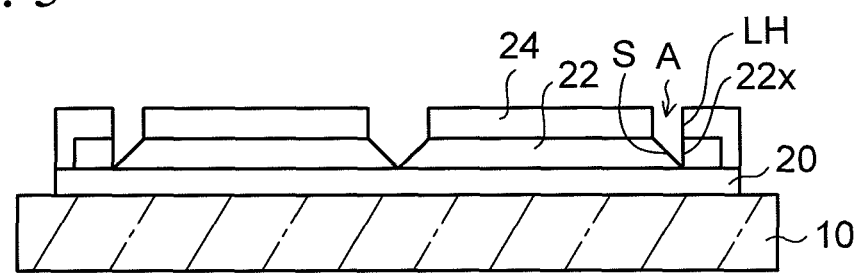
FIG. 5 is a sectional view and a plan view (#5) depicting the method of manufacturing the optical waveguide according to the first embodiment.
Figure 5:
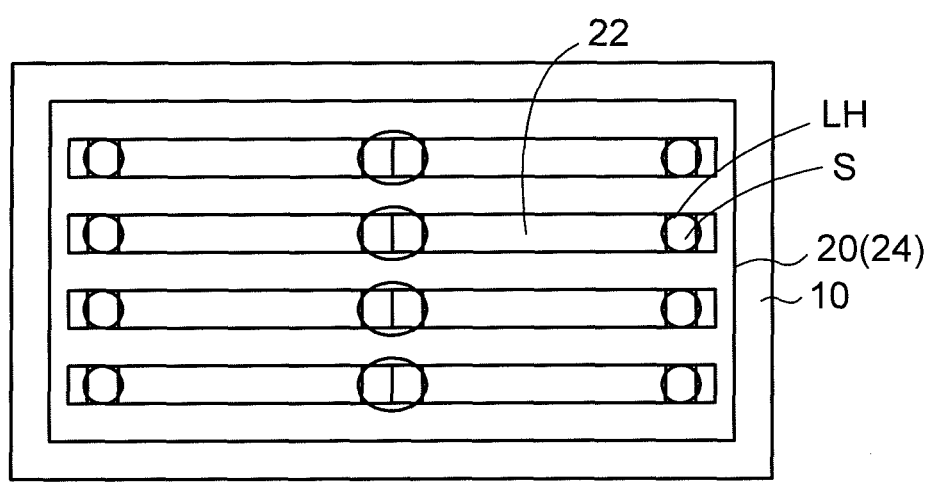
Figure 6:
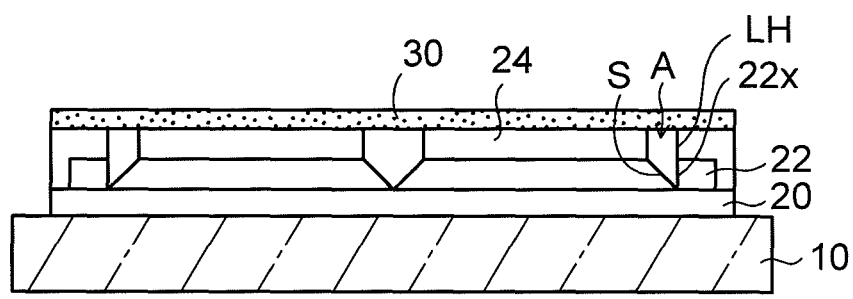
FIG. 6 is a sectional view (#6) depicting the method of manufacturing the optical waveguide according to the first embodiment.
Figure 7:
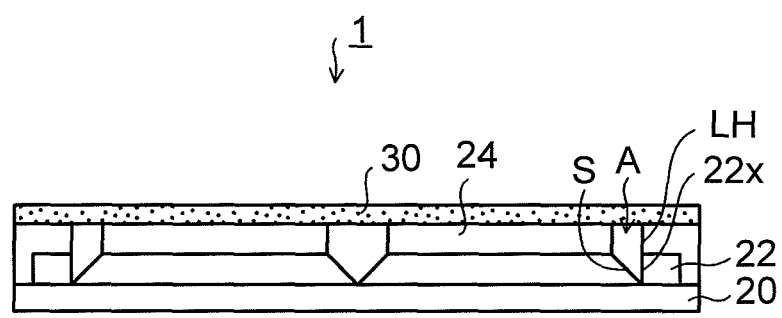
FIG. 7 is a sectional view depicting an optical waveguide according to the first embodiment.

FIG. 1 to FIG. 6 are sectional views and plan views depicting a method of manufacturing an optical waveguide according to a first embodiment, and FIG. 7 is a sectional view depicting an optical waveguide according to the first embodiment.

Figure 1:
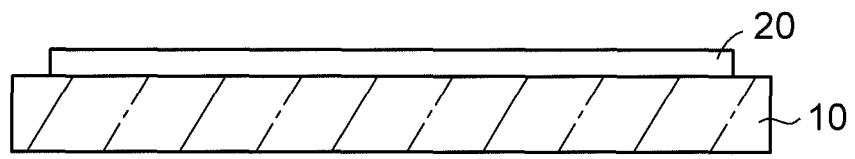
FIG. 1 is a sectional view (#1) depicting a method of manufacturing an optical waveguide according to a first embodiment.

In the method of manufacturing the optical waveguide according to the first embodiment, as depicted in FIG. 1, first, a substrate 10 is prepared. The substrate 10 is prepared as a temporary substrate which is removed finally, and is formed of a polycarbonate resin, or the like, which can be removed by peeling off.

Then, a photosensitive resin layer (not shown) for obtaining a first cladding layer is formed on the substrate 10, and then is exposed/developed based on the photolithography. Then, the photosensitive resin layer is cured by applying the heating process at about 140° C. Accordingly, a first cladding layer 20 is formed in an optical waveguide forming area on the substrate 10. A thickness of the first cladding layer 20 is set in a range from 10 μm to 20 μm, for example.

Figure 2:
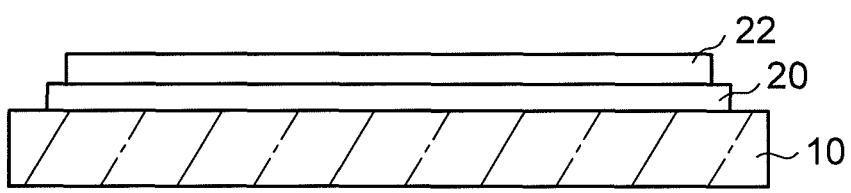
FIG. 2 is a sectional view and a plan view (#2) depicting the method of manufacturing the optical waveguide according to the first embodiment.
Figure 2:
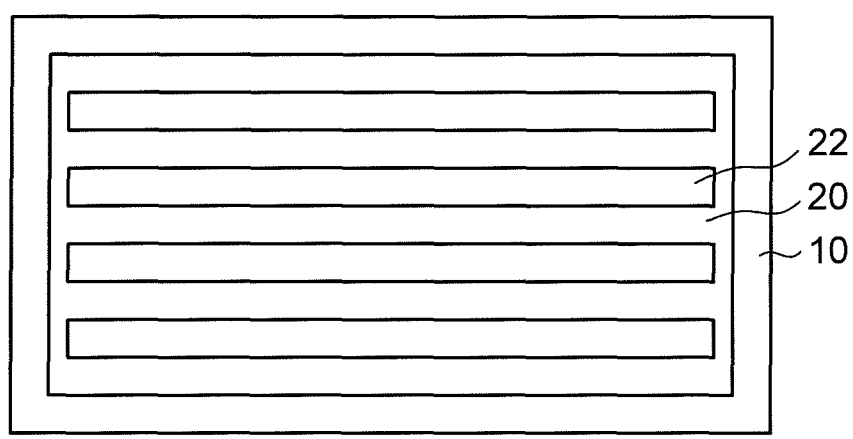

Then, as depicted in FIG. 2, a photosensitive resin layer (not shown) for obtaining a core layer is formed on the first cladding layer 20. Then, the photosensitive resin layer is exposed/developed based on the photolithography, and then is cured by applying the heating process at about 140° C. Accordingly, core layers 22 are made to the pattern collectively and formed on the first cladding layer 20.

Then, as depicted in a plan view of FIG. 2, a plurality of core layers 22 like a belt shape each of which extends in the lateral direction are arranged side by side on the first cladding layer 20 in the longitudinal direction. A refractive index of the core layer 22 is set higher than a refractive index of the first cladding layer 20 and a second cladding layer described later.

A thickness of the core layer 22 is set in a range from 30 μm to 80 μm, and an alignment pitch of the core layers 22 is set to about 250 μm.

Figure 3:
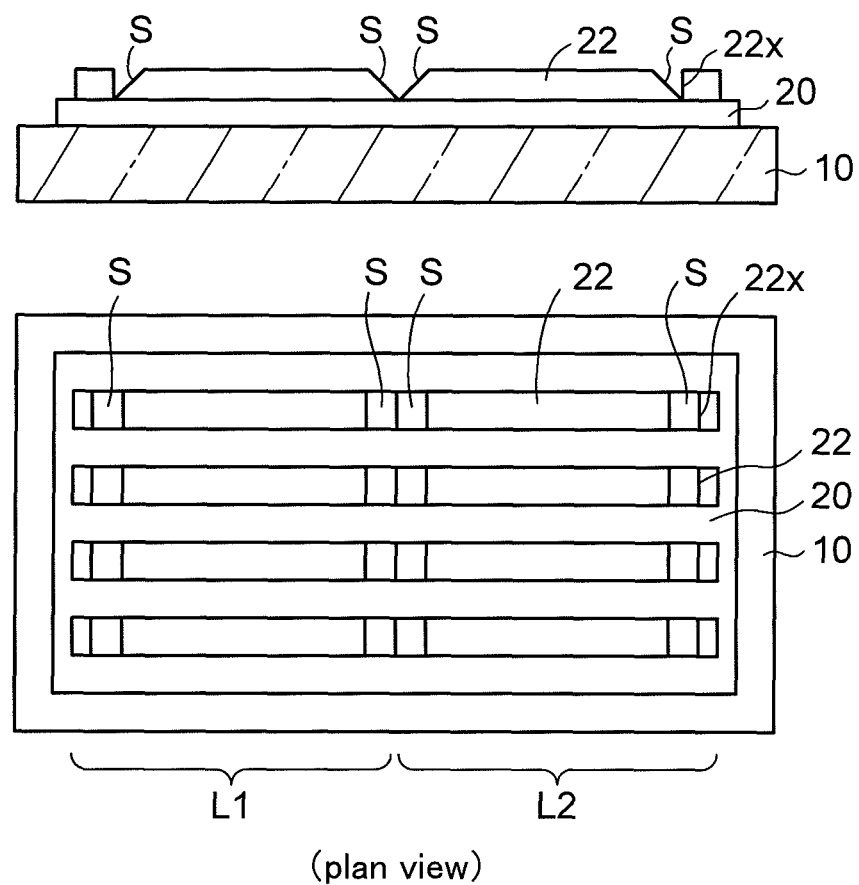
FIG. 3 is a sectional view and a plan view (#3) depicting the method of manufacturing the optical waveguide according to the first embodiment.

Then, as depicted in FIG. 3, parts serving as light path converting portions of the core layers 22 are cut and processed by the rotary blade of the cutting device such that the core layers 22 are divided in the thickness direction. By this matter, groove portions 22x each including a light path conversion inclined surface S are formed in the core layers 22 respectively. The light path conversion inclined surface S is formed such that this inclined surface S is inclined to intersect with the extending direction (light propagation direction) of the core layer 22 at a predetermined angle (preferably, 45°).

The groove portion 22x divides the core layer 22, and further may be formed up to the middle point of a thickness of the first cladding layer 20.

In a plan view of FIG. 3, an example in which a first light path L1 and a second light path L2 are provided in the core layers 22 respectively is illustrated. Also, the light path conversion inclined surface S is arranged on both end parts of the first light path L1 and the second light path L2 respectively.

In this manner, in the present embodiment, immediately after the core layers 22 are formed (before the core layers 22 are covered with the second cladding layer), the groove portions 22x each including the light path conversion inclined surface S are formed in the core layers 22. By this matter, the groove portions 22x are arranged only on respective core layers 22 so as to be separated like an island, therefore a total volume (cutting amount) of the groove portions 22x can be reduced. Accordingly, there is no fear that mechanical strength of the optical waveguide is weakened.

Figure 4:
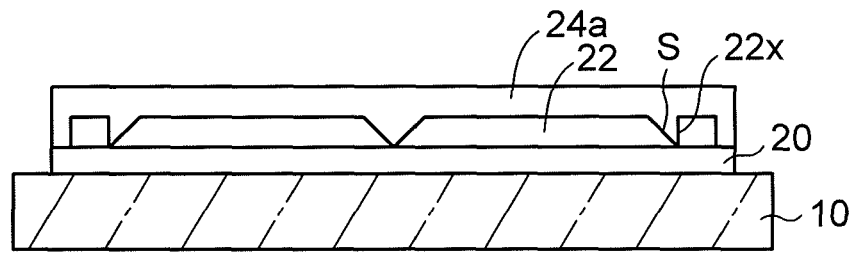
FIG. 4 is a sectional view (#4) depicting the method of manufacturing the optical waveguide according to the first embodiment.

Then, as depicted in FIG. 4, a photosensitive resin layer 24a for obtaining a second cladding layer is formed on the first cladding layer 20 and the core layers 22. In FIG. 4, the photosensitive resin layer 24a for obtaining the second cladding layer is formed so as to cover (wrap around) the core layers 22.

As the photosensitive resin layer 24a, preferably a UV-curable epoxy resin, or the like should be used. As the method of forming the photosensitive resin layer 24a, a photosensitive resin sheet being kept in a semi-cured state (B-stage) may be pasted, or a liquid photosensitive resin may be coated.

In the above-mentioned step of forming the first cladding layer 20 and the core layers 22, preferably the similar resin should be used.

At this point of time, such a state is obtained that the groove portions 22x formed in the core layers 22 are filled with the photosensitive resin layer 24a.

Also, as depicted in FIG. 5, the photosensitive resin layer 24a is exposed/developed by the photolithography technology via a photo mask (not shown) such that an opening portion is formed just over the groove portions 22x of the core layers respectively. Then, the photosensitive resin layer 24a is cured by applying the heating process at about 140° C.

Accordingly, a second cladding layer 24 in which light path conversion holes LH are arranged on the groove portions 22x each including the light path conversion inclined surface S respectively is obtained. A thickness (containing the core layer 22) of the second cladding layer 24 from an upper surface of the first cladding layer 20 is set in a range from about 40 μm to 100 μm, for example. In a plan view of FIG. 5, the second cladding layer 24 is depicted in a perspective view.

A shape of the light path conversion hole LH is depicted as a circular shape, but this shape may be formed as a quadrangular shape. Also, the light path conversion hole LH of the second cladding layer 24 is formed substantially perpendicularly in the thickness direction of the second cladding layer 24.

In this manner, only the light path conversion inclined surfaces S of the core layer 22 are brought into an exposed state in the light path conversion holes LH in the second cladding layer 24 in such a state that the major part of the core layer 22 (the part where a light propagates the core layer 22) is covered with the second cladding layer 24. An inner part of the light path conversion hole LH constitutes an air layer A, so that a light path that a light propagates through the core layer 22 can be converted at an air boundary of the light path conversion inclined surface S by 90°.

In the present embodiment, the photosensitive resin layer 24a is patterned by the photolithography technology that enables the micro-fabrication, and thus the second cladding layer 24 is formed. Therefore, the light path conversion holes LH in the second cladding layer 24 can be arranged just over the light path conversion inclined surfaces S with good precision, and also the light path conversion inclined surfaces S can be exposed with good reliability.

Unlike the present embodiment, in the case that the light path conversion holes LH in the second cladding layer 24 are formed by the mechanical processing, it is difficult to expose the light path conversion inclined surfaces S by finely processing selectively only the second cladding layer 24. For this reason, the superiority of the use of the photolithography can be understood.

Also, such a structure is constructed that the air layer A is not arranged in the unnecessary areas (the areas between the core layers 22) other than the light path conversion inclined surfaces S. Therefore, a risk that a foreign matter adheres onto the light path conversion inclined surfaces S can be reduced.

Here, instead of the use of the photosensitive resin layer 24a, the second cladding layer 24 having the light path conversion holes LH may be formed by pasting a resin film in which opening portions are provided, on the core layers 22. In this case, the opening portions (the light path conversion holes LH) may be provided in advance in the resin film by the press working, or the like so as to correspond to the groove portions 22x of the core layers 22.

By the above matter, a structural body in which the core layers 22 are surrounded by the first cladding layer 20 and the second cladding layer 24 on the substrate 10 is formed.

Then, as depicted in FIG. 6, a sealing layer 30 is formed on the second cladding layer 24, and thus the air layers A in the light path conversion holes LH are hermetically sealed with the sealing layer 30. By this matter, the air layers A are formed inside. As the preferable example of the method of forming the sealing layer 30, a resin film such as an epoxy resin in a semi-cured state, or the like is pasted, and then is cured and adhered by applying the heating process.

In the present embodiment, since the light path is converted at the air boundary of the light path conversion inclined surface S, it is needed that the sealing layer 30 does not enter into the light path conversion holes LH. For this reason, a resin film whose flowability at a time of curing is low is used as the sealing layer 30, and the light path conversion holes LH are capped with the sealing layer 30 such that the sealing layer 30 (the resin) does not enter into the light path conversion holes LH to leave the air layers A.

In the present embodiment, the sealing layer 30 can be formed by curing a resin film in a semi-cured state and adhering the resin film. Accordingly, unlike the method of fixing the covering member by the adhesive, there is no fear that the adhesive enters into the light path conversion holes LH, and the air layers A in the light path conversion holes LH can be hermetically sealed with good reliability.

Here, in the case that there is no necessity that the air layers A in the light path conversion holes LH should be hermetically sealed, the sealing layer 30 may be omitted.

Then, as depicted in FIG. 7, a lower surface of the first cladding layer 20 is exposed by removing the substrate 10 from the structural body in FIG. 6. Since the substrate 10 is formed of a polycarbonate resin, or the like, the substrate 10 can be removed easily by peeling off from the boundary with the first cladding layer 20.

By the above matter, an optical waveguide 1 of the present embodiment can be obtained.

As explained above, in the method of manufacturing the optical waveguide of the first embodiment, first, the first cladding layer 20 and the core layers 22 are formed sequentially on the substrate 10. Then, the groove portions 22x each including the light path conversion inclined surface S are formed in the core layers 22 respectively. Then, the second cladding layer 24 in which the light path conversion hole LH is arranged on the groove portions 22x of the core layers 22 respectively is formed.

According to the employment of the above approach, the groove portions 22x each including the light path conversion inclined surface S are formed only in the core layers 22. Therefore, a total volume of the groove portions 22x can be reduced, and also sufficient mechanical strength of the optical waveguide 1 can be obtained.

Also, the light path conversion hole LH in the second cladding layer 24 can be formed easily on the groove portions 22x formed in the core layers 22 by the photolithography respectively. Accordingly, such a structure is constructed that the air layer A for light reflecting exists only in the areas on the light path conversion inclined surfaces S in respective core layers 22, and the unnecessary air layer does not exist in the areas between the core layers 22. As a result, reliability of the light path converting portion can be improved.

As depicted in FIG. 7, in the optical waveguide 1 of the first embodiment, the core layers 22 like a belt shape each extending in the lateral direction are arranged side by side in the longitudinal direction on the first cladding layer 20 (also see a plan view of FIG. 5). The groove portions 22x each including the light path conversion inclined surface S are formed in the core layers 22 so as to divide the core layers 22. The light path conversion inclined surface S is inclined to intersect with the extending direction (light propagation direction) of the core layer 22 at a predetermined angle (preferably, 45°).

Also, the second cladding layer 24 in which the light path conversion hole LH is arranged on the groove portions 22x (the light path conversion inclined surface S) of the core layers 22 respectively is formed on the first cladding layer 20 and the core layers 22. The air layer A exists in the light path conversion hole LH, the air boundary of the light path conversion inclined surface S functions as a mirror surface that reflects a light, and the light path that a light propagates through the core layer 22 can be converted by 90°.

Also, the sealing layer 30 which covers the light path conversion hole LH is formed on the second cladding layer 24, and the air layers A in the light path conversion holes LH are hermetically sealed.

Figure 8:
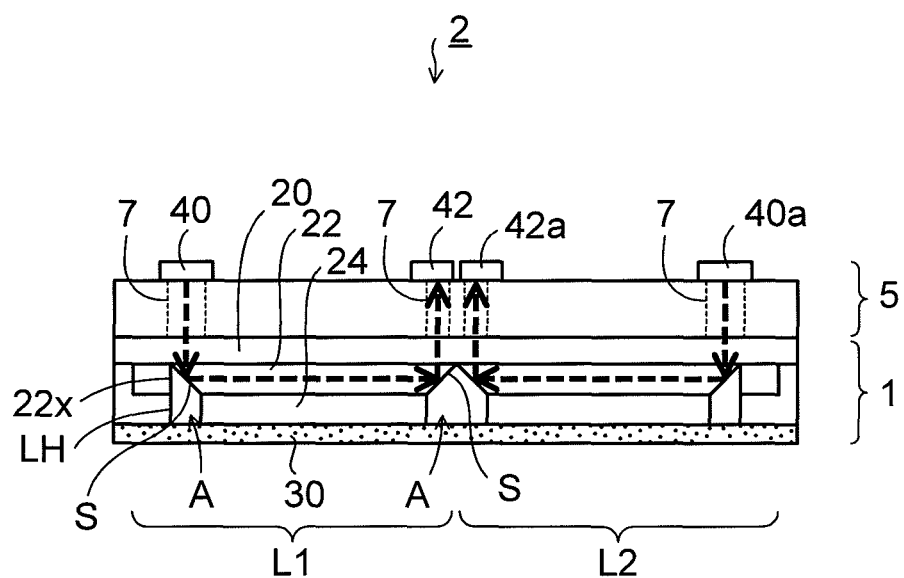
FIG. 8 is a sectional view depicting an optical waveguide device according to the first embodiment.

In FIG. 8, an optical waveguide device 2 in which light emitting elements and light receiving elements are optically coupled to the optical waveguide 1 in FIG. 7 is depicted. The optical waveguide 1 of the present embodiment does not include a rigid substrate because the substrate 10 is removed. Then, the optical waveguide 1 can be constructed as a flexible optical waveguide device by connecting the optical waveguide 1 to a flexible wiring substrate.

As depicted in FIG. 8, in the optical waveguide device 2 of the first embodiment, the optical waveguide 1 in above FIG. 7 is arranged in a state that the top and bottom reverse. Then, a wiring substrate 5 having wiring layers (not shown) serving as the electric wirings is arranged and fixed on the outer surface side of the first cladding layer 20 of the optical waveguide 1 (the opposite surface to the core layer 22 side in the first cladding layer 20). The wiring substrate 5 is the flexible wiring substrate that uses a polyimide film, or the like as a substrate.

A first light emitting element 40 is mounted and connected to connection pads (not shown) of the wiring substrate 5 such that this first light emitting element 40 is optically coupled to the light path conversion inclined surface S on one end side (left side) of the first light path L1 of the optical waveguide 1. The first light emitting element 40 is connected to the connection pads (not shown) of the wiring substrate 5 in a state that its light emitting surface is directed downward. As the first light emitting element 40, the surface emitting laser (VCSEL: Vertical Cavity Surface Emitting Laser) is used preferably.

Also, a first light receiving element 42 is mounted and connected to connection pads (not shown) of the wiring substrate 5 such that this first light receiving element 42 is optically coupled to the light path conversion inclined surface S on the other end side (right side) of the first light path L1 of the optical waveguide 1. The first light receiving element 42 is connected to the connection pads (not shown) of the wiring substrate in a state that its light receiving surface is directed downward. As the first light receiving element 42, the photodiode is used preferably.

A light transmitting opening portion 7 is provided in parts of the wiring substrate 5 under the first light emitting element 40 and the first light receiving element 42 respectively.

In the optical waveguide device 2 of the present embodiment, electric signals being output from a first LSI chip (a driver, or the like)(not shown) are supplied to the first light emitting element 40, and then the light is emitted downward from the first light emitting element 40. The light being emitted from the first light emitting element arrives at the light path conversion inclined surface S on one end side of the optical waveguide 1. Also, the light is reflected by the air boundary between the light path conversion inclined surface S and the air layer A, and the light path is converted by 90°, and then the light is entered to the core layer 22.

Then, the light which is entered to the core layer 22 propagates through the core layer 22 while repeating a total reflection, and arrives at the light path conversion inclined surface S on the other end side of the optical waveguide 1. Then, the light is reflected by the air boundary of the light path conversion inclined surface S on the other end side, and the light path is converted by 90°, and then the light is entered to the first light receiving element 42.

The first light receiving element 42 converts the light signal into the electric signal, and the electric signal is supplied to a second LSI chip (not shown)(TIA: Transimpedance Amplifier, or the like).

In the optical waveguide device 2 of the present embodiment, the optical waveguide 1 having desired characteristics and the clean light path conversion inclined surface S are provided. Therefore, the first light emitting element 40 and the first light receiving element 42 can be optically coupled to the optical waveguide 1 with good reliability.

Also in the second light path L2 of the optical waveguide 1, a second light emitting element 40*a* and a second light receiving element 42*a* are optically coupled to the optical waveguide 1 by the similar construction to the above-mentioned first light path L1, and the light propagation is performed via the similar light path.

Second Embodiment

Figure 9A:
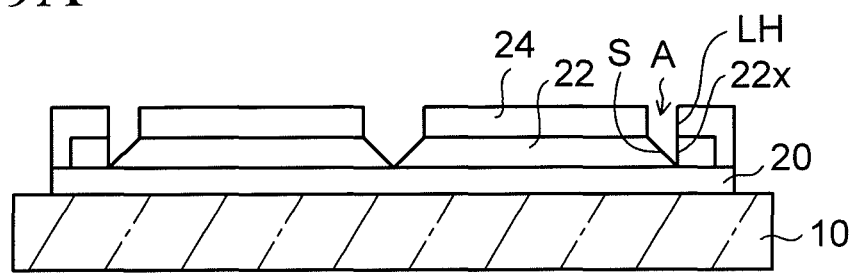
FIGS. 9A to 9C are sectional views depicting a method of manufacturing an optical waveguide device according to a second embodiment.
Figure 9B:
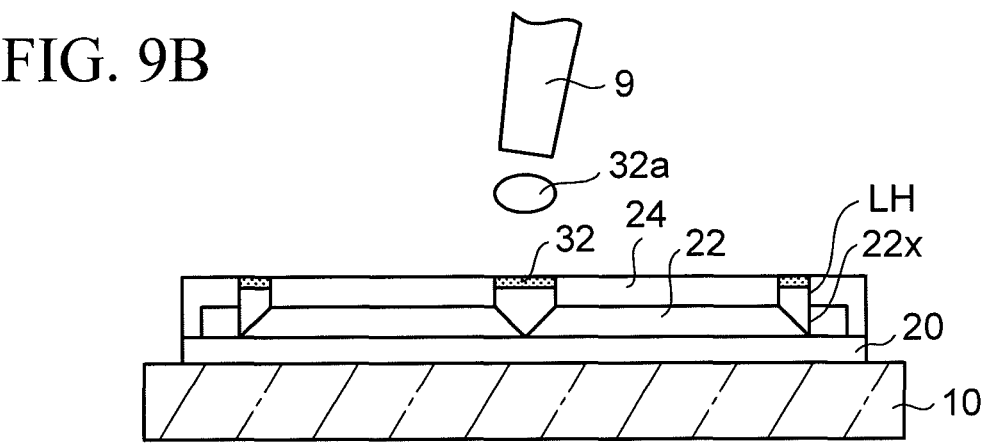
Figure 9C:
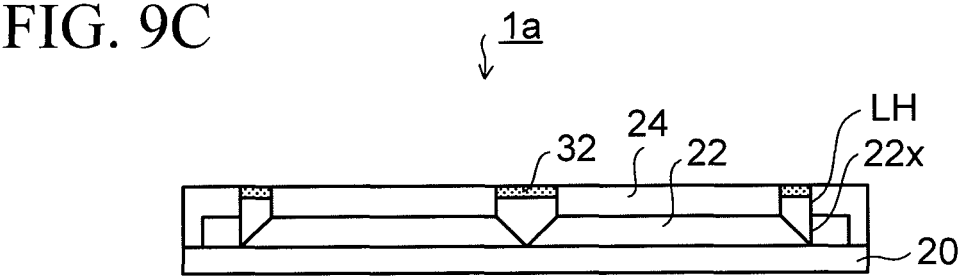

FIGS. 9A to 9C are sectional views depicting a method of manufacturing an optical waveguide device according to a second embodiment. A difference of the second embodiment from the first embodiment resides in that, in place of the formation of the sealing layer 30 over the whole surface, the sealing layer is formed partially only in the areas containing the light path conversion hole LH.

In the second embodiment, the same reference symbols are affixed to the same steps and the same elements in the first embodiment, and their detailed explanation will be omitted herein.

As depicted in FIG. 9A, the identical structural body with that in FIG. 5 is obtained by the similar method to the first embodiment. Then, as depicted in FIG. 9B, a resin material 32*a* is coated selectively on the areas containing the light path conversion hole LH by a nozzle 9 of the dispensing equipment, and then the resin material 32*a* is cured by applying the heating process. Thus, a sealing portion 32 is formed.

By this matter, the air layer A in the light path conversion hole LH is hermetically sealed by the sealing portion 32. As the resin material 32*a*, a resin which has a higher viscosity of an extent that this resin does not pour into the light path conversion hole LH is employed. Then, the resin material 32*a* is collectively coated on the area that is one size larger than the light path conversion hole LH. Thus, the light path conversion hole LH is covered with the sealing portion 32 so as to remain the air layer A.

Then, as depicted in FIG. 9C, like the first embodiment, the substrate 10 is removed from the structural body in FIG. 9B.

By this matter, an optical waveguide 1*a* according to the second embodiment is obtained. Also in the optical waveguide 1*a* of the second embodiment, like the first embodiment, the light emitting element and the light receiving element, which are mounted on the wiring substrate, are optically coupled to the optical waveguide 1*a*. The optical waveguide 1*a* of the second embodiment can attain the similar advantages to those of the optical waveguide 1 of the first embodiment.

Third Embodiment

Figure 10A:
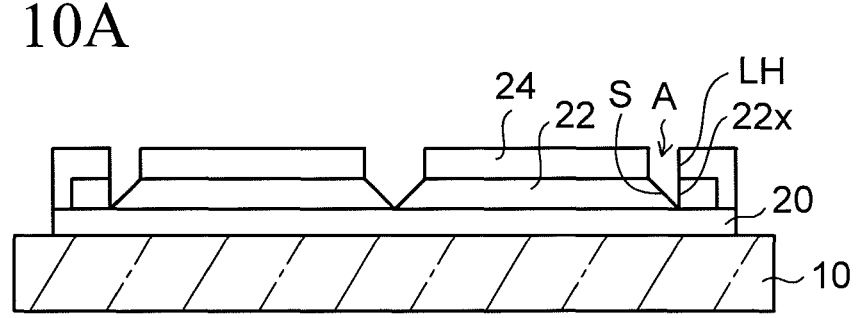
FIGS. 10A and 10B are sectional views depicting a method of manufacturing an optical waveguide device according to a third embodiment.
Figure 10B:
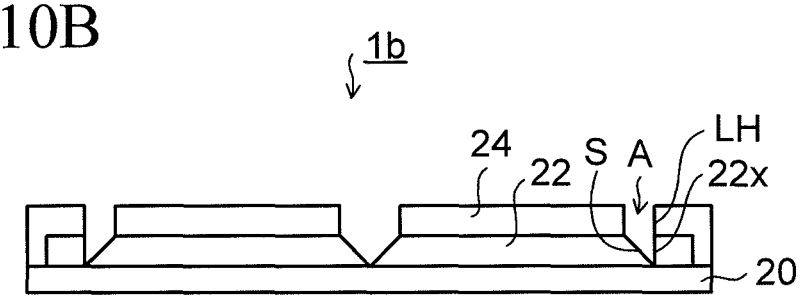
Figure 11:
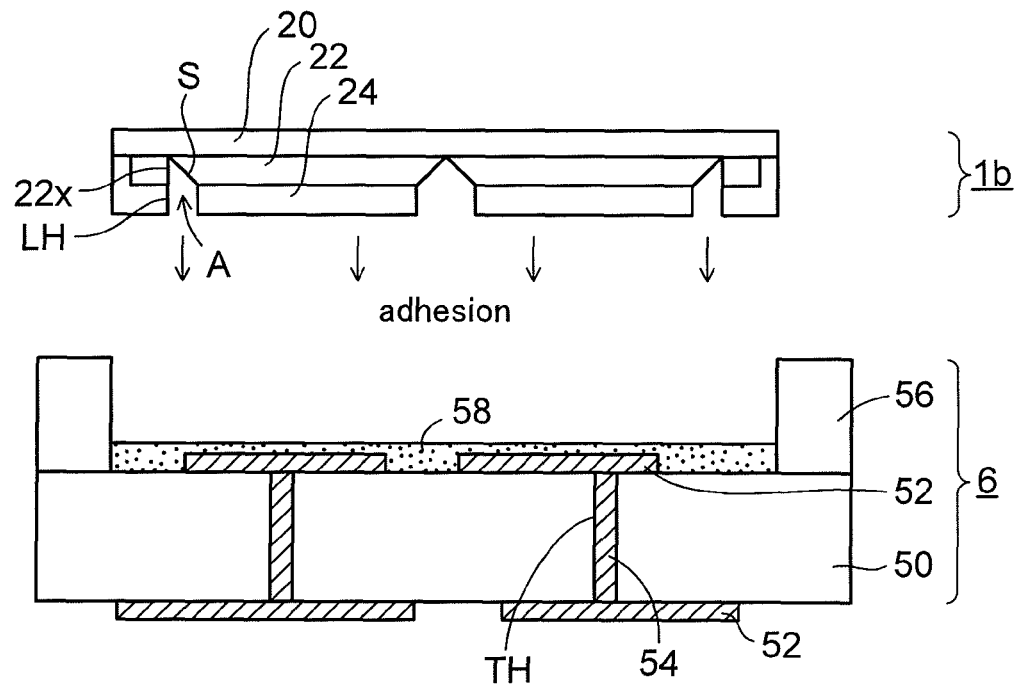
FIG. 11 is a sectional view depicting a state to connect the optical waveguide in FIG. 10B to a wiring substrate.
Figure 12:
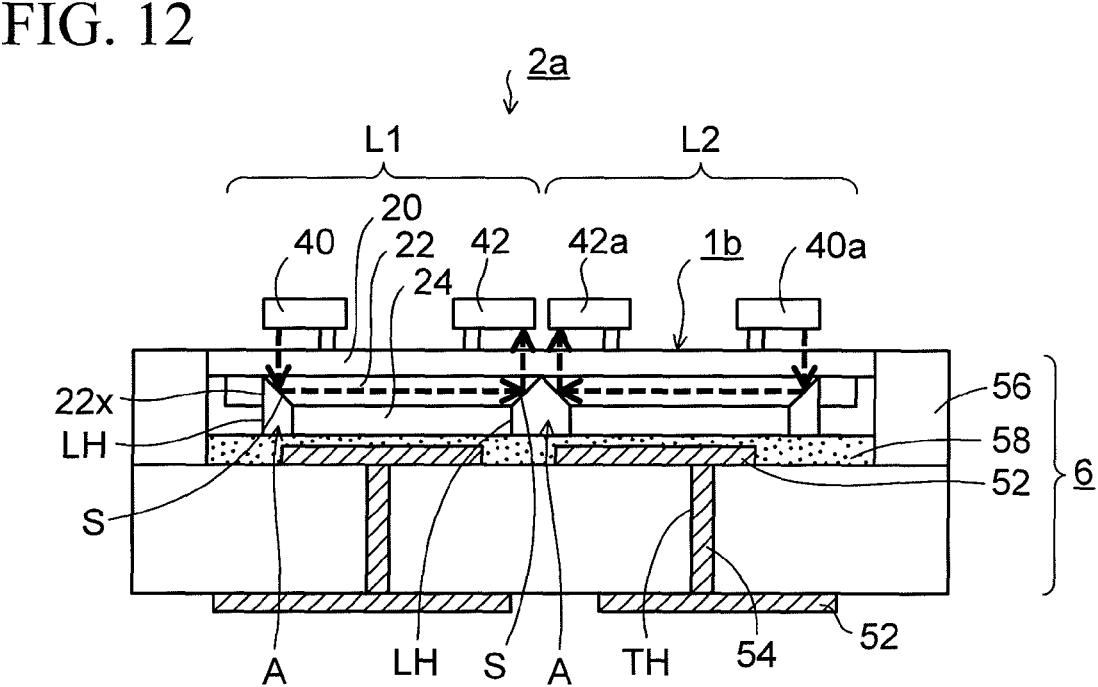
FIG. 12 is a sectional view depicting an optical waveguide device according to the third embodiment.

FIGS. 10A and 10B are sectional views depicting a method of manufacturing an optical waveguide device according to a third embodiment, FIG. 11 is a sectional view depicting a state to connect the optical waveguide in FIG. 10B to a wiring substrate, and FIG. 12 is a sectional view depicting an optical waveguide device according to the third embodiment.

A feature of the third embodiment resides in that, the sealing layer is not formed at the time of manufacturing the optical waveguide, while a surface of the optical waveguide located on the light path conversion hole side is adhered onto the wiring substrate via an adhesive layer, thereby the light path conversion hole is hermetically sealed by the adhesive layer.

In the third embodiment, the same reference symbols are affixed to the same steps and the same elements in the first embodiment, and their detailed explanation will be omitted herein.

As depicted in FIG. 10A, the identical structural body with that of FIG. 5 is obtained by the similar method to the first embodiment. Then, as depicted in FIG. 10B, the sealing layer 30 or the sealing portion 32 is not formed in the third embodiment, and the substrate 10 is removed from the structural body in FIG. 10A.

By this matter, an optical waveguide 1*b* of the third embodiment is obtained. In the optical waveguide 1*b* of the third embodiment, the sealing layer 30 or the sealing portion 32 is not provided, and the light path conversion hole LH has the released structure.

Then, as depicted in FIG. 11, a rigid type wiring substrate 6 having rigidity is prepared. In the wiring substrate 6, a wiring layer 52 serving as an electric wiring is formed on both surface sides of an insulating substrate 50 formed of a glass epoxy resin, or the like respectively.

Then, through holes TH are provided in the insulating substrate 50, and a penetration electrode is filled in the through holes TH respectively. The wiring layers 52 on both surface sides are connected mutually via the penetration electrodes 54. Also, a solder resist 56 is formed like a frame on the peripheral edge part of the insulating substrate 50.

Then, the optical waveguide 1*b* in FIG. 10B described above is reversed up and down, and then a surface of the optical waveguide 1*b* located on the light path conversion hole LH side is adhered to the wiring substrate 6 via an adhesive layer 58. As the adhesive layer 58, a resin film kept in a semi-cured state or a liquid resin is used, and is cured by applying the heating process after the optical waveguide 1*b* is arranged on the wiring substrate 6. Thus, the optical waveguide 1*b* can be fixed on the wiring substrate 6 by the adhesive layer 58.

By this matter, as depicted in FIG. 12, the air layers A in the light path conversion holes LH of the optical waveguide 1*b* are hermetically sealed by the adhesive layer 58. The adhesive layer 58 functions as the adhesive agent which fixes the optical waveguide 1*b* to the wiring substrate 6, and also functions as the sealing layer which seals the air layers A in the light path conversion holes LH of the optical waveguide 1*b*.

Then, like the first embodiment, the first light emitting element 40 is connected to connection pads (not shown) of the wiring substrate 6 and is mounted thereon such that this first light emitting element 40 is optically coupled to the light path conversion inclined surface S located on one side (left side) of the first light path L1 of the optical waveguide 1b. Also, like the first embodiment, the first light receiving element 42 is connected to connection pads (not shown) of the wiring substrate 6 and is mounted thereon such that this first light receiving element 42 is optically coupled to the light path conversion inclined surface S located on the other side (right side) of the first light path L1 of the optical waveguide 1b.

Also in the second light path L2 of the optical waveguide 1b, the second light emitting element 40a and the second light receiving element 42a are mounted on the wiring substrate 6 such that these elements are optically coupled to the light path conversion inclined surfaces S of the optical waveguide 1b by the similar structure to the first light path L1 described above.

By this matter, an optical waveguide device 2a according to the third embodiment is obtained.

Also in the third embodiment, the light is propagated from the first light emitting element 40 to the first light receiving element 42 through the similar light path to that in the first embodiment. Also in the second light path L2 of the optical waveguide 1b, the light is propagated from the second light emitting element 40a to the second light receiving element 42a through the similar light path to the first light path L1.

The optical waveguide 1b of the third embodiment can attain the similar advantages to those of the optical waveguide 1 in the first embodiment. In addition to this, in the third embodiment, a surface of the light path conversion hole LH side of the optical waveguide 1b is adhered to the wiring substrate 6 by the adhesive layer 58. Therefore, the adhesive layer 58 can also used as the sealing layer, and the formation of the sealing layer can be omitted in the steps of manufacturing the optical waveguide.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relates to a showing of the superiority and interiority of the invention. Although the embodiments of the present invention have been described in detail, it should be understood that the various changes, substitutions, and alterations could be made hereto without departing from the spirit and scope of the invention.

What is claimed is:

1. A method of manufacturing an optical waveguide, comprising:
    forming a first cladding layer on a substrate;
    forming a core layer on the first cladding layer;
    forming groove portions including a light path conversion inclined surface, the groove portions arranged to be separated like an island, by processing only the core layer in a thickness direction;
    forming a second cladding layer, in which a light path conversion hole is arranged in only a region just above the light path conversion inclined surface, on the first cladding layer and the core layer; and
    forming a sealing layer covering the light path conversion hole,
    wherein the light path conversion hole is formed perpendicularly in a thickness direction of the second cladding layer, and an air layer for light reflecting is provided in the light path conversion hole.

2. A method of manufacturing an optical waveguide, according to claim 1, wherein the forming of the second cladding layer, includes
    forming a photosensitive resin layer, and
    forming the light path conversion hole by patterning the photosensitive resin layer by a photolithography.

3. A method of manufacturing an optical waveguide, according to claim 1, wherein the sealing layer is formed partially as a sealing portion in an area containing the light path conversion hole.

4. A method of manufacturing an optical waveguide, according to claim 1, after the forming of the second cladding layer, or after the forming of the sealing layer in a case that the sealing layer is formed,
    further comprising:
    removing the substrate.

5. An optical waveguide, comprising:
    a first cladding layer;
    a core layer formed on the first cladding layer;
    groove portions formed to be separated like an island in a thickness direction of only the core layer, and the groove portions including a light path conversion inclined surface;
    a second cladding layer formed on the first cladding layer and the core layer, and in which a light path conversion hole is arranged in only a region just above the light path conversion inclined surface; and
    a sealing layer covering the light path conversion hole,
    wherein the light path conversion hole is formed perpendicularly in a thickness direction of the second cladding layer, and an air layer for light reflecting is provided in the light path conversion hole.

6. An optical waveguide according to claim 5, wherein the sealing layer is formed partially as a sealing portion in an area containing the light path conversion hole.

7. An optical waveguide device, comprising:
    the optical waveguide set forth in claim 5;
    a wiring substrate arranged on an outer surface side of the first cladding layer of the optical waveguide;
    a light emitting element mounted on the wiring substrate and coupled optically to the light path conversion inclined surface on one end side of the optical waveguide; and
    a light receiving element mounted on the wiring substrate and coupled optically to the light path conversion inclined surface on other end side of the optical waveguide.

8. An optical waveguide device, comprising:
    the optical waveguide set forth in claim 5;
    a wiring substrate arranged on a surface of the light path conversion hole side of the optical waveguide via an adhesive layer;
    a light emitting element mounted on the wiring substrate of the optical waveguide mounting face side, and coupled optically to the light path conversion inclined surface on one end side of the optical waveguide; and
    a light receiving element mounted on the wiring substrate of the optical waveguide mounting face side, and coupled optically to the light path conversion inclined surface on other end side of the optical waveguide;
    wherein an air layer in the light path conversion hole is sealed with the adhesive layer.

9. An optical waveguide device, comprising:
    the optical waveguide set forth in claim 6;
    a wiring substrate arranged on an outer surface side of the first cladding layer of the optical waveguide;
    a light emitting element mounted on the wiring substrate and coupled optically to the light path conversion inclined surface on one end side of the optical waveguide; and a light receiving element mounted on the wiring substrate and coupled optically to the light path conversion inclined surface on other end side of the optical waveguide.

* * * * *